UNITED STATES PATENT OFFICE.

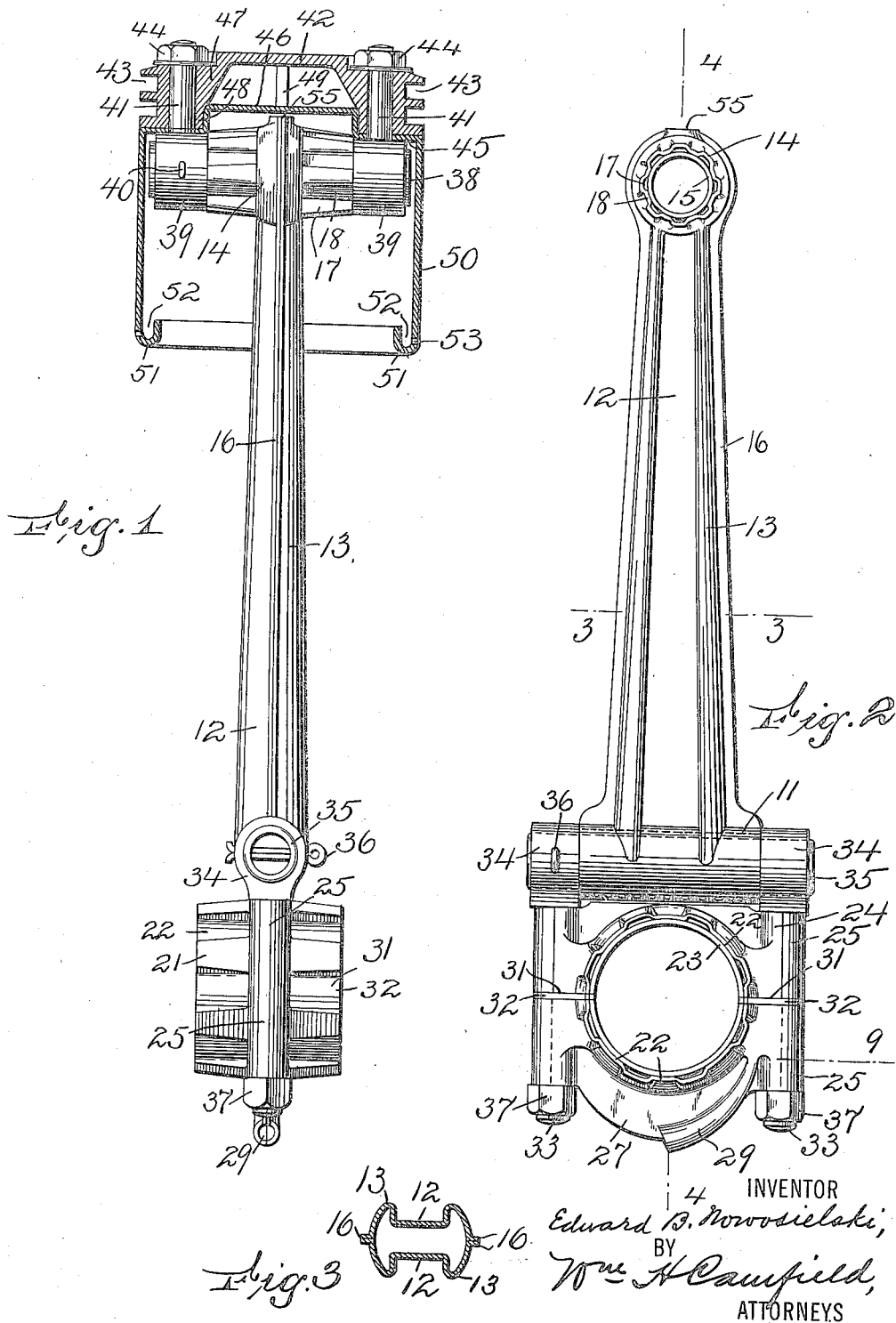

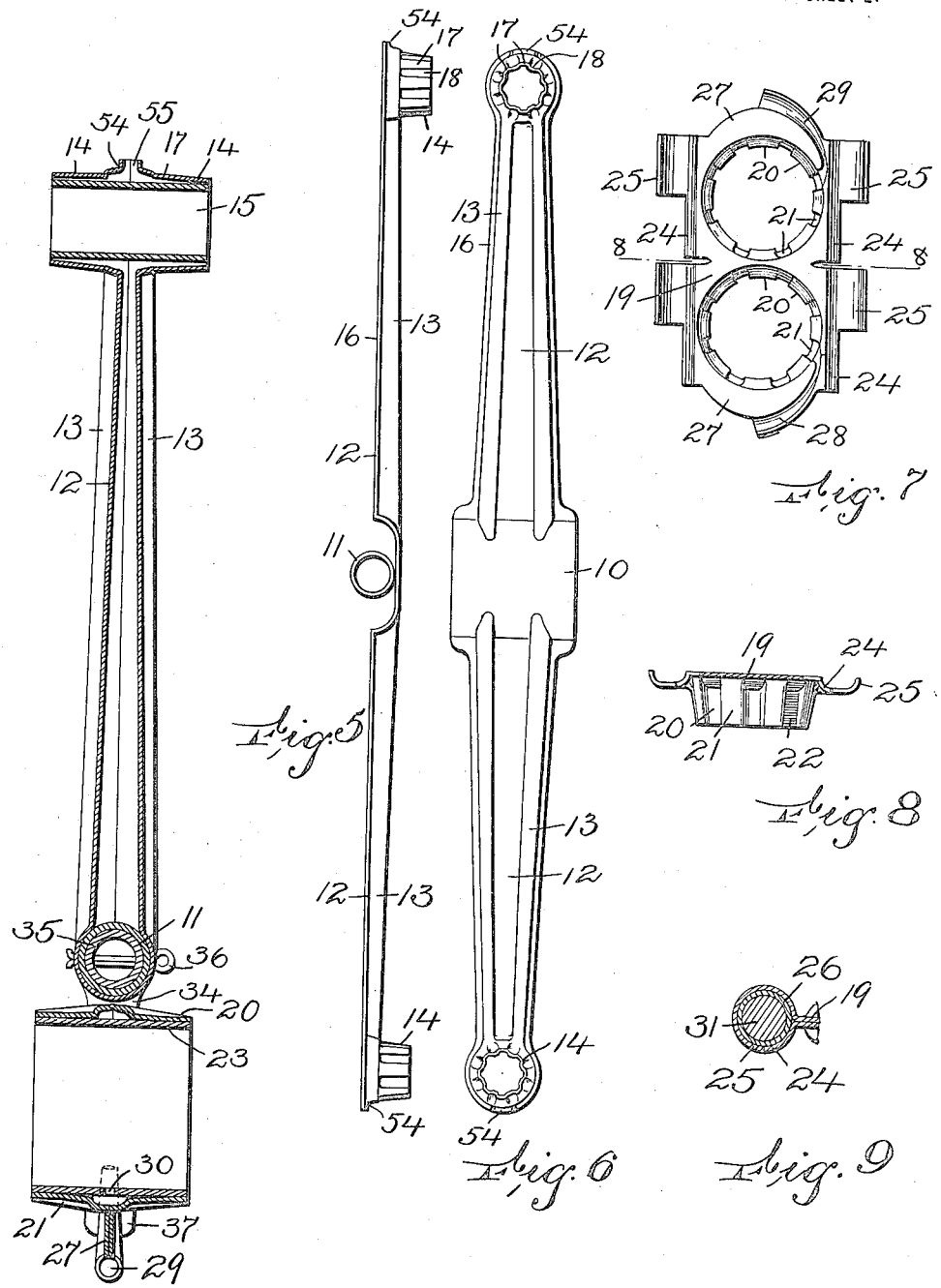

EDWARD B. NOWOSIELSKI, OF BLOOMFIELD, NEW JERSEY.

DEVICE FOR TRANSMITTING MOTION FROM PISTONS OF ENGINES TO CRANK-SHAFTS.

1,254,345.      Specification of Letters Patent.     Patented Jan. 22, 1918.

Application filed February 23, 1917. Serial No. 150,325.

*To all whom it may concern:*

Be it known that I, EDWARD B. NOWOSIELSKI, a citizen of the United States, and a resident of Bloomfield, county of Essex, and State of New Jersey, have invented certain new and useful Improvements in Devices for Transmitting Motion from Pistons of Engines to Crank-Shafts, of which the following is a specification.

This invention relates to an improved construction of part of an engine and can be used on different types of engines, on compressors, drills and so forth, but it is particularly adapted for use on internal combustion engines and has for its object to make a light, stiff, economical structure.

The invention is particularly designed to be adapted for engines used in automobiles, aeroplanes, and in similar situations where it is necessary to have strength and lightness, and the part of the engine concerned is that part that embraces the piston and its connection with the crank shaft, these parts being self-alining whereby friction is reduced and longer service of the parts is brought about.

The construction embodied in this invention comprises a piston, a connecting rod and a bearing at the end of the connecting rod, which bearing forms part of the connecting rod and engages the crank, these parts being made for the most part of sheet metal and being disposed and assembled so as to equalize and distribute strains in order to prevent any distortion of the sheet metal parts, but to give them the same strength and rigidity as solid metal, but reducing to a great extent the weight of these parts.

The invention is further designed to provide the parts hereinabove mentioned which can be manufactured economically, as the time consumed in making this device is short and the material employed is small in quantity, but is distributed to give strength where desired and flexibility at the proper places.

The invention is illustrated in the accompanying drawings in which Figure 1 is an end view of the bearing that engages the crank, the connecting rod and the piston, the latter being shown in section. Fig. 2 is a front view of the part shown in Fig. 1 with the piston removed. Fig. 3 is a section on line 3—3, in Fig. 2. Fig. 4 is a section on line 4—4, in Fig. 2. Figs. 5 and 6 are an edge view and a face view, respectively, of a blank from which the connecting rod is made, and Figs. 7 and 8 are a face view and an edge view, respectively, of the blank from which the crank-engaging part of the connecting rod is made, and Fig. 9 is a section on line 9—9, in Fig. 2, illustrating a detail of how the bolt sleeve is embraced.

The connecting rod is fastened to the piston and the crank-engaging part thereof is secured to the crank, the connecting rod being made of sheet metal, but it will be understood in describing these drawings that the cylinder and the crank have been omitted, since they are not essential to an understanding of the device. The main part or shank of the connecting rod is made of sheet metal which in blank form is illustrated in Figs. 5 and 6. The central portion 10 of the blank is where it is folded, and it is preferably folded around the short tube 11, this tube being as long as the part 10 is wide. The blank when thus folded forms a barrel or loop, and the arms 12 extend therefrom forming a shank, each of these arms preferably being reinforced and strengthened by ribs 13, and at the outer ends of the arms 12 are bosses 14, which bosses extend outwardly so as to form sufficient support for an upper bearing sleeve 15. Before this bearing sleeve 15 is inserted, the parts are folded as above described, the edges 16, shown more particularly in Fig. 3, abutting so as to close the sides of the rod, these abutting edges being brazed or otherwise suitably fastened, and if desired one can be made slightly longer than the other to provide for crimping them prior to the brazing step, or if they are crimped, the brazing can, if desired, be dispensed with. In order to further strengthen the bosses they are provided with ribs 17, the spaces 18 between the ribs being adapted to engage, particularly at their outer ends, the upper bearing sleeve 15, and after the parts have been assembled the bearing sleeve 15 is driven into place with a very tight fit, and this end is then brazed or otherwise suitably fastened, and if it is fastened by dipping it into spelter, the ribs provide sufficient outlet for the spelter that does not engage the parts where they contact so that it will flow therefrom and not be lodged within the bosses to add weight to the device. The barrel portion 10 is arranged at right angles to the upper bearing and is connected to the crank-engaging part. The crank-engaging part of the connecting rod is made from a blank shown in Figs. 7 and 8 and comprises a sheet of metal 19 provided with bosses 20, which bosses are formed with ribs 21, the spaces 22 between the ribs 21 being substantially the same diameter as a lower bearing sleeve 23, the insertion of which will be described hereinafter. The sheet of metal 19 is folded at the top to bring these bosses 20 back to back, and the outer edges are provided with wings 24 and 25 so that when folded a wing 24 will be opposite a wing 25 on each side and on the top and bottom edges of the folded blank so that each of the wings 25 will be folded around three-quarters of the way so as to embrace bolt sleeves 26 on each side of the lower bearing. Folding the wings 25 beyond the center in this manner prevents seams at the outer edges of the folded parts and thus insures the parts against separation by reason of such embracing of the bolt sleeves on the far side. After the blank has been folded, the lower bearing sleeve 23 is forced into place and then suitably fastened by brazing, the ribs strengthening the crank-engaging part of the connecting rod and also providing means for the spelter to flow out after the part has been dipped. The lower parts 27 of the blank 19 abut but are each provided with a depressed part 28 which come together when the blank is folded and form a tube 29 which is preferably slightly larger at its outer end than at its inner end and which is adapted, when the crank-engaging part is rapidly rotated on a crank, to receive oil and conduct it to the space between the bosses 20 and the sleeve 23, and the oil can then pass through an opening 30 in the sleeve 23 to insure the lubrication of the crank-engaging part and the crank. The folded blank 19, the sleeve 23 and the bolt sleeves 26, after they have been assembled, are sawed through the center, as at 31, so that two halves are formed from the parts thus sawed, providing an upper and lower member of the crank-engaging bearing, and when in place these parts abut on a suitable bottom 32. Bolts 33 are inserted in the bolt sleeves 26, the entrance of these bolts being limited by eyes 34 arranged at their top ends, these eyes having openings in line with the opening in the tube 11, and a pin 35, preferably hollow, acts as a pivot or pintle for these parts and is removably held in place by suitable means, such as the cotter pins 36. Nuts 37 on the ends of the bolts 33 securely hold the parts at the lower end of the device together, and thus insure the engagement of the crank-engaging part with the crank. It will thus be seen that the connecting rod and the crank-engaging part are in pivotal relation so that they are self-alining when the engine is in operation, since the pivotal connection between these parts is at right-angles or transverse to the axis of the crank and also at right-angles to the connection between the connecting rod and the piston so that the crank-engaging part and the crank will remain parallel and not be subjected to any wear that will produce rocking of the parts relative to each other. In other words, the bearing will wear evenly.

The upper bearing where it is connected to the piston can be of different forms, but I prefer to connect the parts by means of a pin 38 which is preferably hollow to lighten it, this pin passing through the upper bearing sleeve 15 and also through eyes 39, being held therein by any form of means permitting the detachment of the parts, such as the cotter pins 40. The eyes 39 are on the ends of bolts 41, which bolts pass through an upper head 42 of the piston, this head being preferably of cast metal so as to give rigidity to this end of the piston and to provide enough material in which the grooves 43 can be placed for the reception of piston rings. Nuts 44 fasten the bolts 41 in place, the bolts 41 also passing through the head 45 of the sheet metal body portion of the piston. The end 45 of the sheet metal body portion is preferably raised as at 46 to provide a projection onto which the recessed part of the head 42 fits, the head 42 being made substantially thin and light except for bosses 47 to receive the bolts 41 and to provide projections 48 against which the raised part 46 rests, and it may also be provided with a suitable number of ribs 49 which strengthen the head and also engage the raised part 46. The bolts 41 are thus relieved of any shearing strain and the openings in the head 45, through which these bolts 41 pass, are not subjected to any side strain to enlarge the holes.

The sheet metal body portion of the piston extends down, having the side walls 50, and is curled or crimped at the bottom as at 51, providing an annular trough 52, and in the usual splash system of lubrication, the trough 52 will receive oil which passes out through holes 53 near the base of the trough and thus the lubrication of the piston and cylinder is insured.

If desired, I may provide the blank from which the connecting rod is made with recesses 54 which, when the blank is folded, provide an opening 55 between them so that lubricant can pass down through this opening and onto the bearing between the connecting rod and the piston. The wrist pin 38, the eyes 39, the bosses 17 and the upper sleeve bearing 15 provide a simple, rigid and light connection between the connecting rod and the piston and there is no side movement of the wrist pin.

The parts of the mechanism herein described are easily and quickly assembled and are just as easily taken apart for repairs or adjustment, and lightness and strength are combined in the parts made as described.

I do not wish to limit myself to the exact forms and shapes, nor to the particular disposition of the parts herein described, and I may make changes in the details of construction without departing from the invention as set forth in the claims.

A material part of this invention is the tube 29 which is inclined downward and in the direction of rotation of the crank-engaging part, and when the crank rotates and carries the crank-engaging part with it, each successive movement of the crank-engaging bearing in the lower part of its rotation causes oil to be forced through the tube 29 and up into the chamber formed in the crank-engaging bearing from which it passes through the oil passages within the bearing to the parts that require the lubrication.

Having thus described my invention, I claim:

1. In a connecting rod, a shank comprising a sheet of metal bent to form a loop at one end of the shank and having at its other end outwardly extending bosses with ribs therein, and a bearing sleeve in the bosses.

2. In a connecting rod, a shank comprising a sheet of metal bent to form a loop at one end of the shank and having at its other end outwardly extending bosses with ribs therein, a bearing sleeve in the bosses the rod having ribs formed therein, the edges of the metal forming the ribs being secured together to form a seam.

3. In a connecting rod, a shank comprising a sheet of metal bent to form a loop at one end of the shank and having at its other end outwardly extending bosses with ribs therein, a bearing sleeve in the bosses, a crank-engaging bearing having two members adapted to embrace a crank, bolts securing the members in place and having eyes thereon, and a pin passing through the eyes and the loop of the rod.

4. In a connecting rod, a crank-engaging bearing having a chamber inside thereof, a bearing sleeve, and a tubular part in said bearing and disposed so that on rotation of said bearing with a crank oil is conducted from the crank case of the engine into the chamber, above the bottom of the chamber, the bearing having an oil passage from the chamber.

5. In a connecting rod, a crank-engaging bearing having an oil receiving chamber and an oil passage from said chamber so as to lubricate the bearing, and a tube extending from said chamber downward and inclined in the direction of rotation of the crank-engaging bearing and communicating with said chamber above the bottom thereof, whereby oil is delivered to the chamber above its bottom.

6. In a connecting rod, a crank-engaging bearing comprising a folded sheet of metal provided with bosses set back to back, the side edges of the folded portions being of unequal lengths at opposed points so that said folded portions are brought out of register and beyond the center of the bearing.

7. In a connecting rod, a crank-engaging bearing comprising a folded sheet of metal formed into opposed bosses, the side edges of the bearing being of unequal lengths at opposed points to bring the seams of the folded sheet beyond the center of said bearing, and bolt sleeves within said folded portion.

8. In a connecting rod, a crank-engaging bearing comprising a sheet of metal formed into opposed bosses, the side edges of the bearing being of unequal lengths at opposed points so that the seams are beyond the center of said bearing, and bolt sleeves within said folded portion, said bosses having ribs formed therein, the opposed portions of said bearing having depressions which are in register and form a tube extending downward from the interior of said bearing and inclined in the direction of rotation of said bearing when in operation.

9. In a connecting rod, a shank comprising a sheet of metal bent to form a loop at one end of the shank and having at its other end outwardly extending bosses, the axis of the loop and the axes of the bosses being substantially at right angles to each other.

10. In a connecting rod, a shank comprising a sheet of metal bent to form a loop at one end of the shank and having outwardly extending arms which are arranged to abut, said abutting arms having outwardly extending bosses therein, the axes of said bosses being at a right angle to the axis of the loop.

11. In a connecting rod, a shank comprising a sheet of metal bent to form a loop at one end of the shank and having outwardly extending arms which are arranged to abut, said abutting arms having outwardly extending bosses therein, the axes of said bosses being at a right angle to the axis of the loop, the bosses being formed with ribs therein, and a bearing sleeve in said bosses and contacting with the inner circular edges of said ribs.

In testimony that I claim the foregoing, I have hereto set my hand, this 17th day of February, 1917.

EDWARD B. NOWOSIELSKI.